United States Patent
Tseng et al.

(10) Patent No.: US 9,762,059 B2
(45) Date of Patent: Sep. 12, 2017

(54) FAN SYSTEM AND VOLTAGE STABILIZING MODULE FOR MULTI POWER SOURCE INPUT

(71) Applicant: DELTA ELECTRONICS, INC., Taoyuan (TW)

(72) Inventors: Wei-Shuo Tseng, Taoyuan (TW); Chao-Chin Chuang, Taoyuan (TW); Chih-Hsiang Kuo, Taoyuan (TW); Yi-Kuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 22 days.

(21) Appl. No.: 14/711,250

(22) Filed: May 13, 2015

(65) Prior Publication Data

US 2015/0333515 A1 Nov. 19, 2015

(30) Foreign Application Priority Data

May 14, 2014 (TW) .............................. 103116928 A

(51) Int. Cl.
*G05F 1/70* (2006.01)
*H02J 3/00* (2006.01)
(Continued)

(52) U.S. Cl.
CPC .............. *H02J 3/005* (2013.01); *F04D 25/06* (2013.01); *F04D 27/00* (2013.01); *F04D 27/008* (2013.01); *H02J 3/01* (2013.01); *H02J 4/00* (2013.01); *H02M 1/10* (2013.01); *H02M 7/04* (2013.01); *H02P 27/06* (2013.01); *F04D 25/0613* (2013.01); *H02J 2001/002* (2013.01); *H02M 1/4225* (2013.01); *Y02B 70/126* (2013.01); *Y02E 40/40* (2013.01); *Y10T 307/391* (2015.04)

(58) Field of Classification Search
CPC ...... Y02B 70/1441; H02M 2007/4815; H02M 5/927; H02M 5/458
See application file for complete search history.

(56) References Cited

U.S. PATENT DOCUMENTS 7,190,091 B1 * 3/2007 Marshall ................. H02M 1/10
307/128
2009/0009122 A1 * 1/2009 Yoshitomi ............. H02P 7/2913
318/504
(Continued)

FOREIGN PATENT DOCUMENTS

CN 201994693 U 9/2011
TW 201349722 A 12/2013

*Primary Examiner* — Shawki S Ismail
*Assistant Examiner* — Zoheb Imtiaz
(74) *Attorney, Agent, or Firm* — Muncy, Geissler, Olds & Lowe, P.C.

(57) ABSTRACT

A voltage stabilizing module for multi power source input is compatible with multiple input power sources including DC power source and/or AC power source and comprises a plurality of receiving ends, a power source selection unit and a voltage conversion unit. The receiving ends receive the input power sources. The power source selection unit is coupled with the receiving ends to receive the input power sources and sets at least one of the input power sources as a working power source. The voltage conversion unit receives the working power source and keeps the working power source at a working voltage level to act as a voltage signal outputted to a loading.

10 Claims, 3 Drawing Sheets

(51) Int. Cl.
　　　*H02M 7/04*　　　(2006.01)
　　　*F04D 25/06*　　　(2006.01)
　　　*F04D 27/00*　　　(2006.01)
　　　*H02P 27/06*　　　(2006.01)
　　　*H02M 1/10*　　　(2006.01)
　　　*H02J 3/01*　　　(2006.01)
　　　*H02J 4/00*　　　(2006.01)
　　　*H02M 1/42*　　　(2007.01)
　　　*H02J 1/00*　　　(2006.01)

(56)　　　　　　　References Cited

U.S. PATENT DOCUMENTS

2009/0284077 A1* 11/2009 Huang ................ H02J 3/005
　　　　　　　　　　　　　　　　　　　307/80
2010/0066171 A1* 3/2010 Thakur ................ H02J 1/102
　　　　　　　　　　　　　　　　　　　307/43
2012/0080953 A1* 4/2012 Wang ................. H02M 1/10
　　　　　　　　　　　　　　　　　　　307/72
2013/0069435 A1* 3/2013 Li ....................... H02J 9/06
　　　　　　　　　　　　　　　　　　　307/66

* cited by examiner

FAN SYSTEM AND VOLTAGE STABILIZING MODULE FOR MULTI POWER SOURCE INPUT

CROSS REFERENCE TO RELATED APPLICATIONS

This Non-provisional application claims priority under 35 U.S.C. §119(a) on Patent Application No(s). 103116928 filed in Taiwan, Republic of China on May 14, 2014, the entire contents of which are hereby incorporated by reference.

BACKGROUND OF THE INVENTION

Field of Invention

The invention relates to a fan system and a voltage stabilizing module for multi power source input and, in particular, to a voltage stabilizing module for multi power source input of a fan system.

Related Art

With the progress of technologies, the efficiency of an electronic device is unceasingly enhanced. However, if the heat generated by the electronic device can't be dissipated properly, the efficiency of the electronic device will be reduced and even the electronic device will be damaged. Therefore, a heat dissipating device has become an indispensible appliance for the electronic device.

Generally, the power source of a fan is usually a single input power source. So, if the input power source fails, the fan will shut down and can't provide the heat dissipating mechanism for the environment, and the system will be thus overheated and damaged.

SUMMARY OF THE INVENTION

A voltage stabilizing module for multi power source input according to this invention is compatible with multiple input power sources including DC power source and/or AC power source and comprises a plurality of receiving ends, a power source selection unit and a voltage conversion unit. The receiving ends receive the input power sources. The power source selection unit is coupled with the receiving ends to receive the input power sources and sets at least one of the input power sources as a working power source. The voltage conversion unit receives the working power source and keeps the working power source at a working voltage level to act as a voltage signal outputted to a loading.

A fan system according to this invention is compatible with multiple input power sources including DC power source and/or AC power source and comprises a fan motor, a driving circuit and a voltage stabilizing module for multi power source input. The driving circuit is connected with the fan motor. The voltage stabilizing module for multi power source input comprises a plurality of receiving ends, a power source selection unit and a voltage conversion unit. The receiving ends receive the input power sources. The power source selection unit is coupled with the receiving ends to receive the input power sources and sets at least one of the input power sources as a working power source. The voltage conversion unit receives the working power source and keeps the working power source at a working voltage level to act as a voltage signal outputted to the driving circuit. The driving circuit receives the working power source to drive the fan motor to operate.

In one embodiment, the power source selection unit includes a switch circuit and a control circuit. The switch circuit is coupled with the receiving ends to receive the input power sources. The control circuit is coupled with the switch circuit.

In one embodiment, the voltage conversion unit includes a filter circuit, a rectification circuit and a step-up/step-down circuit. The filter circuit is coupled with the power source selection unit. The rectification circuit is coupled with the filter circuit. The step-up/step-down circuit is coupled with the filter circuit and the rectification circuit.

In one embodiment, the filter circuit filters out the noise of the working power source.

In one embodiment, when the working power source is an AC power source, the rectification circuit rectifies the working power source into a DC power source.

In one embodiment, the step-up/step-down circuit keeps the working power source at the working voltage level to act as the voltage signal outputted to the driving circuit.

In one embodiment, the step-up/step-down circuit is a power factor correction (PFC) circuit.

A fan system according to this invention comprises a fan motor, a driving circuit and a voltage stabilizing module. The driving circuit is connected with the fan motor. The voltage stabilizing module comprises an input end and a voltage conversion unit. The input end is coupled with a DC power source or an AC power source. The voltage conversion unit is coupled with the input end and receives the DC power source or the AC power source, and keeps the DC power source or the AC power source at a working voltage level to act as a voltage signal outputted to the driving circuit. The driving circuit receives the voltage signal to drive the fan motor to operate.

In one embodiment, the voltage conversion unit comprises a filter circuit, a rectification circuit and a step-up/step-down circuit. The filter circuit is coupled with the input end. The rectification circuit is coupled with the filter circuit. The step-up/step-down circuit is coupled with the filter circuit and the rectification circuit.

In one embodiment, the filter circuit filters out the noise of the DC power source or the AC power source.

In one embodiment, when the input end is coupled with the AC power source, the rectification circuit rectifies the AC power source into a DC power source.

In one embodiment, when the input end is coupled with the DC power source, the DC power source is transmitted to the step-up/step-down circuit without passing through the rectification circuit.

In one embodiment, the step-up/step-down circuit keeps the DC power source or the AC power source at the working voltage level to act as the voltage signal outputted to the driving circuit.

In one embodiment, the step-up/step-down circuit is a power factor correction (PFC) circuit.

As mentioned above, in the fan system and the voltage stabilizing module for multi power source input of the invention, the power source selection unit is configured to receive the multiple input power sources and at least one of the input power sources is used as the working power source to be outputted to the driving circuit of the fan motor. Thereby, when the working power source fails, other input power sources can be introduced to be the new working power source so that the fan motor can still normally function. In some embodiments, the single input end of the fan system can allow the input of the DC power source or the AC power source. Besides, in some embodiments, the voltage conversion unit keeps the working power source at a working voltage level, and therefore the fan motor won't be affected by the voltage level of the input power source so as to be kept at the best efficiency. Furthermore, the driving circuit also won't be affected by the variation of the voltage of the input power source, and therefore the function of protecting the loading can be achieved.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
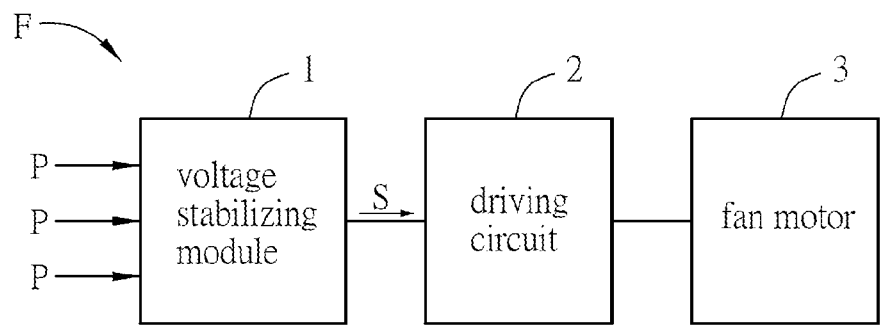
FIG. 1 is a schematic block diagram of a fan system of an embodiment of the invention.
Figure 2:
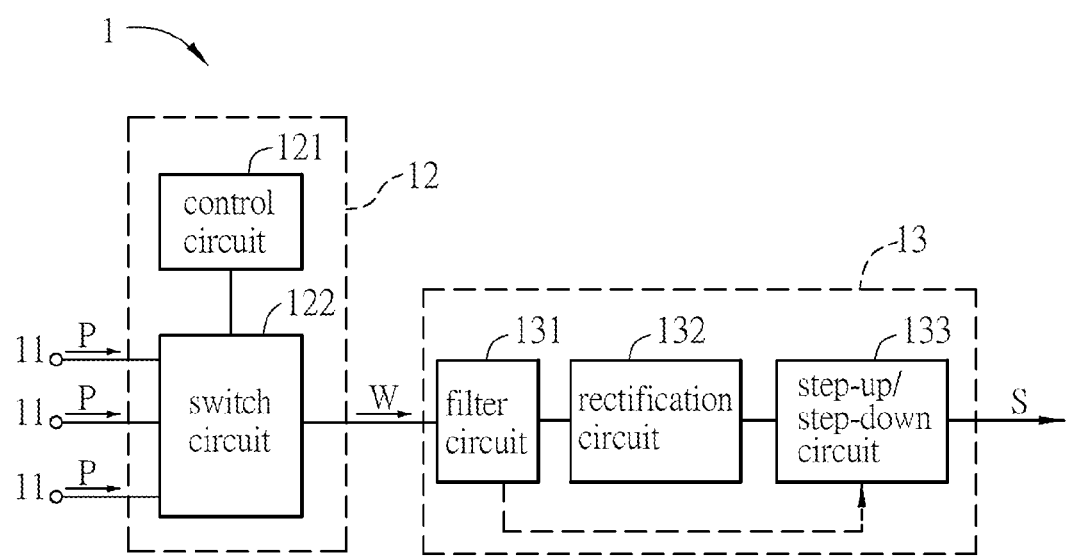
FIG. 2 is a schematic block diagram of a voltage stabilizing module for multi power source input of an embodiment of the invention.

FIG. 1 is a schematic block diagram of a fan system of an embodiment of the invention, and FIG. 2 is a schematic block diagram of a voltage stabilizing module for multi power source input of an embodiment of the invention. As shown in FIGS. 1 and 2, the fan system F can be applied to multiple input power sources P (here are three for example), and the input power source P can include DC power source and/or AC power source. That is, the input power sources P can be all DC or AC power sources, or include DC and AC power sources. Of course, the fan system F also can be applied to a single input power source P. In other words, the fan system F is compatible with a single input power source or multiple input power sources.

Furthermore, the input power source P can come from the same or different power supply, such as utility power, self-prepared power system, or batteries. Each of the input power sources P can have the same or different voltage. By taking the utility power as an example, the input power sources P can be all 110V or 220V, or include 110V and 220V. Moreover, the input power sources P also can include utility power of 110V and the battery assembly of 120V, i.e. the DC power source and the AC power source, at the same time The fan system F includes a voltage stabilizing module for multi power source input 1, a driving circuit 2 and a fan motor 3. The driving circuit 2 is connected to the fan motor 3. The voltage stabilizing module for multi power source input 1 receives the input power sources P and converts at least one of the input power sources P into a voltage signal S, and the driving circuit 2 receives the voltage signal S to drive the fan motor 3 to operate. The elements and functions of the voltage stabilizing module for multi power source input 1 will be illustrated as below.

As shown in FIG. 2, the voltage stabilizing module for multi power source input 1 includes a plurality of receiving ends 11, a power source selection unit 12 and a voltage conversion unit 13. The receiving ends 11 respectively receive the input power sources P. The power source selection unit 12 is coupled with the receiving ends 11 to receive the input power sources P, and sets at least one of the input power sources P as a working power source W. The voltage conversion unit 13 receives the working power source W and keeps the working power source W at a working voltage level to act as the voltage signal S to be outputted to the driving circuit 2. To be noted, the working voltage is favorably determined according to the rated voltage of the driving circuit 2, for example the rated voltage of 730V of the driving circuit 2. Whatever the original voltage of the working power source W is, the voltage conversion unit 13 can keep the voltage of the working power source W at 730V to act as the voltage signal S.

In practice, the receiving end 11 can be a plug or wire to couple the input power source P to the power source selection unit 12. In this embodiment, the power source selection unit 12 can include a control circuit 121 and a switch circuit 122. The control circuit 121 is an IC or an analog circuit for example. The IC can be a micro-processor, an MCU, an FPGA or CPLD, or an ASIC for example. When the power source selection unit 12 receives the input power source P, the control circuit 121 can detect the voltage or amplitude of the input power source P to determine the input power source P is DC or AC power source.

The control circuit 121 can determine the efficiency provided by the input power sources P by the algorithm or logic gate, and can preferentially set the input power source P that can provide higher efficiency as the working power source W. For example, the input power source P of higher voltage or the input power source P with the voltage level closer to the working voltage will be given the priority. Otherwise, the control circuit 121 can preferentially set the input power source P of AC power source as the working power source W. Otherwise, the user can program or set the judging conditions of the control circuit 121 to further set the working power source W according to the requirement.

The switch circuit 122 is coupled with the receiving ends 11 to receive the input power sources P, and the control circuit 121 is coupled with the switch circuit 122. The control circuit 121 can select one of the input power sources P and set it as the working power source W, for example, by switching the switch circuit 122 to execute the OR operation. Otherwise, the control circuit 121 can combine two or more input power sources P as the working power source W, for example, by switching the switch circuit 122 to execute the AND operation. When the plural input power sources P are combined as the input, the input power sources P are connected in parallel and the loading sharing effect can be provided. Moreover, the switch circuit 122 can be embodied by a relay or semiconductor electronic switch. In practice, when detecting the failure of the original working power source W, the control circuit 121 can switch the switch circuit 122 to introduce other input power sources P as the new working power source W so that the driving circuit 2 can continue the normal operation. In other words, if the redundancy of the input power sources P is higher, the stability and reliability of the fan system F will be higher.

The voltage conversion unit 13 includes a filter circuit 131, a rectification circuit 132 and a step-up/step-down circuit 133. The filter circuit 131 is coupled with the power source selection unit 12. The rectification circuit 132 is coupled with the filter circuit 131. The step-up/step-down circuit 133 is coupled with the filter circuit 131 and the rectification circuit 132.

Furthermore, the filter circuit 131 can filter out the noise of the working power source W to enhance the quality of the working power source W. When the working power source W is an AC power source, the rectification circuit 132 can rectify the working power source W into the DC power source. In practice, the rectification circuit 132 can implement the full-wave rectification or half-wave rectification, in consideration of able to generate the DC current by the rectification. Particularly, when the control circuit 121 of the power source selection unit 12 determines the working power source W is DC power source, the control circuit 121 can control that the working power source W is transmitted to step-up/step-down circuit 133 without passing through the rectification circuit 132, or that the rectification circuit 132 doesn't execute the rectification function so that the working power source W is transmitted to the step-up/step-down circuit 133 through the rectification circuit 132, so as to enhance the whole operation efficiency of the fan system F.

The step-up/step-down circuit 133 can keep the working power source W at a working voltage level to act as the voltage signal S and transmit it to the driving circuit 2. When the original voltage of the working power source W (such as utility power of 220 V) is less than the rated voltage (such as 730V), the step-up/step-down circuit 133 can boost the voltage of the working power source W to the working voltage level of the rated voltage. In another aspect, when the original voltage of the working power source W (such as utility power of 110 V) is higher than the rated voltage (such as 90V), the step-up/step-down circuit 133 can reduce the voltage of the working power source W to the working voltage level of the rated voltage. Herein, the step-up/step-down circuit 133 can be a power factor correction (PFC) circuit and have PFC function when the input power source P is an AC power source. Therefore, no matter what the voltage of the input power source P is, the driving circuit 2 can receive the voltage signal S having the rated voltage so that the fan motor 3 can function with the highest efficiency.

Figure 3:
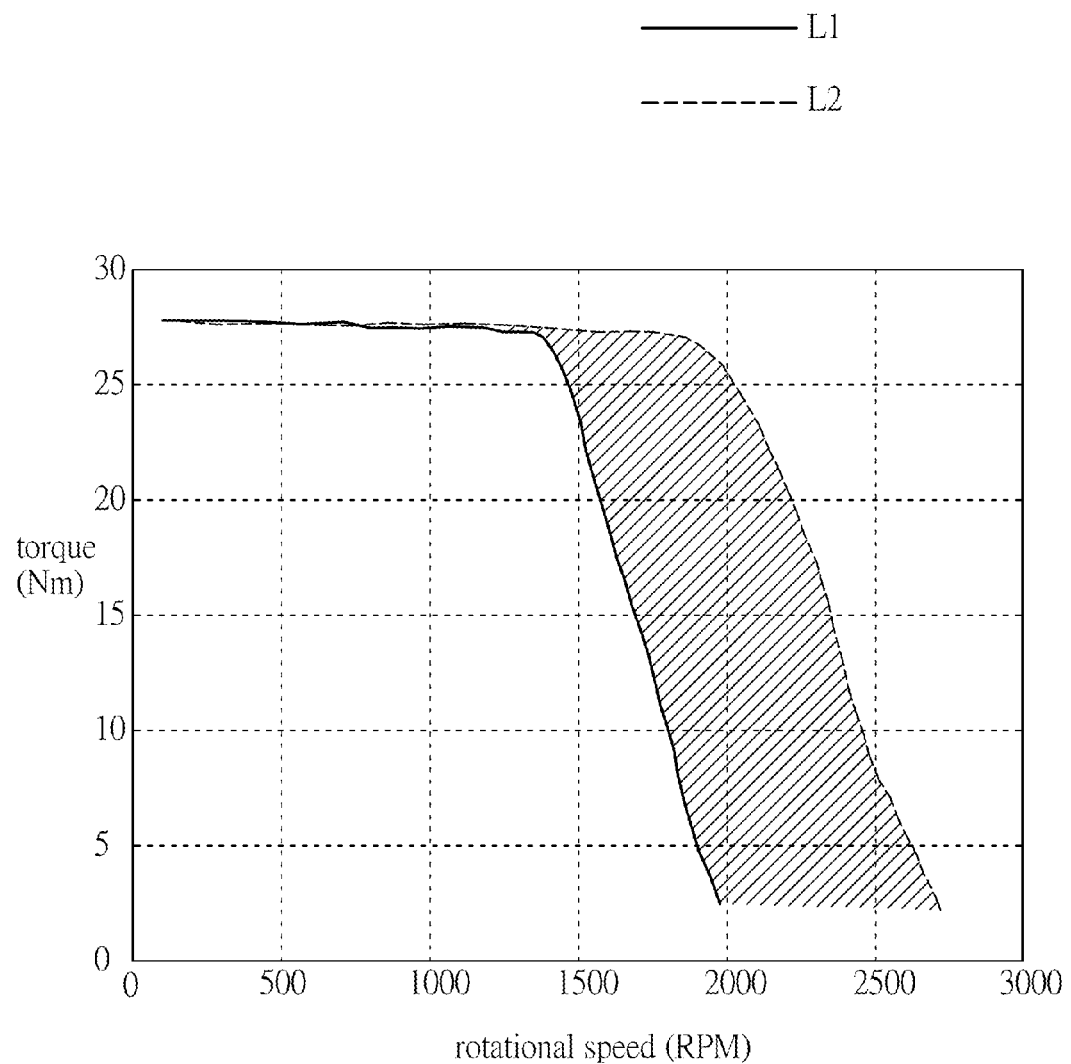
FIG. 3 is a schematic diagram about the rotational speed and torque of the fan motor.

FIG. 3 is a schematic diagram about the rotational speed and torque of the fan motor, wherein the horizontal axis is rotational speed (RPM) and the vertical axis is torque (Nm). As shown in FIGS. 1, 2 and 3, by taking that the rated voltage of the driving circuit 2 is 730V as an example, when the input power source P of 530V is provided, the conventional fan motor just can operate along the solid line L1 with its operation area. However, because the fan system F of this embodiment includes the voltage stabilizing module for multi power source input 1 and the input power source P of 530V can be converted into the voltage signal S of 730V by the step-up/step-down circuit 133, the fan motor 3 can operate at the rated voltage (i.e. along the dotted line L2) with a larger operation area (the increment of the area is denoted by the hatching in FIG. 3). Furthermore, when the input power source P is unstable and the voltage provided thereby is thus changed, for example, to descend to 450V or ascend to 650V, the step-up/step-down circuit 133 can keep the voltage signal S at 730V. That is, the output voltage won't vary with the variation of the input voltage, and therefore the driving circuit 2 can be prevented from being damaged due to the excessive variation of the transient current. Hence, the function of protecting the loading (i.e. the driving circuit 2) can be achieved. As a result, the fan motor 3 of this embodiment can have better performance.

Figure 4:
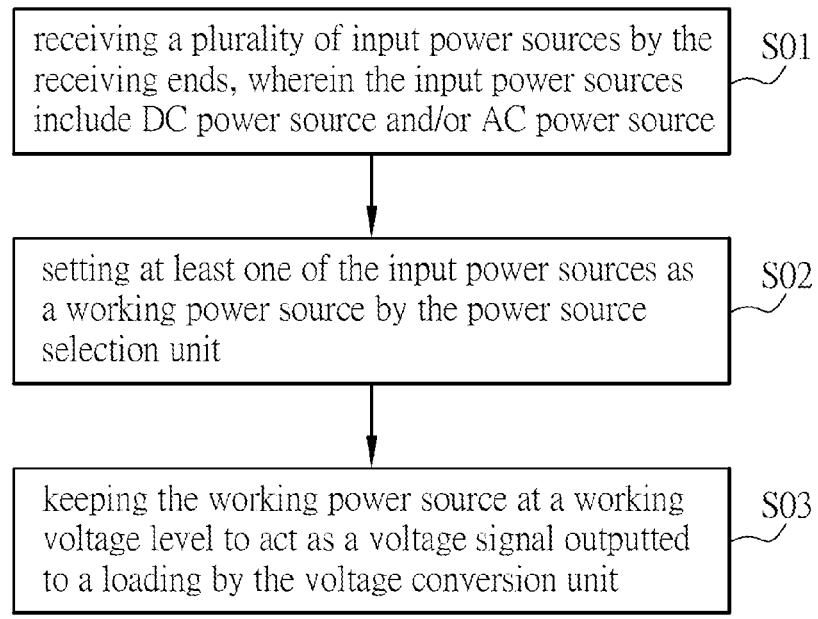
FIG. 4 is a schematic flowchart of the voltage stabilizing method for multi power source input of an embodiment of the invention.

FIG. 4 is a schematic flowchart of the voltage stabilizing method for multi power source input of an embodiment of the invention. As shown in FIGS. 1, 2 and 4, the voltage stabilizing method for multi power source input works with the above-mentioned voltage stabilizing module for multi power source input 1, and since the voltage stabilizing module for multi power source input 1 has been illustrated as above, the related description is omitted here for conciseness. The method includes the steps of: receiving a plurality of input power sources by the receiving ends, wherein the input power sources include DC power source and/or AC power source (step S01); setting at least one of the input power sources as a working power source by the power source selection unit (step S02); and keeping the working power source at a working voltage level to act as a voltage signal outputted to a loading by the voltage conversion unit (step S03).

In the step S01, the voltage stabilizing method for multi power source input is compatible with a single input power source P or multiple input power sources P. The input power source P includes DC power source and/or AC power source, and the input power sources P can have the same or different voltage.

In the step S02, the working power source W can be formed by the input of one of the input power sources P or by the input of at least two of the input power sources P.

In the step S03, the loading can be an electronic product such as a cell phone or computer. In this embodiment, the loading is the fan motor 3 and the driving circuit 2. Besides, the working voltage is favorably the rated voltage of the loading and can be formed by the voltage conversion unit 13 boosting or reducing the voltage of the working power source W. Consequently, no matter what the voltage of the input power source P is, the loading can receive the voltage signal S having the rated voltage so as to be kept at the best efficiency.

Figure 5:
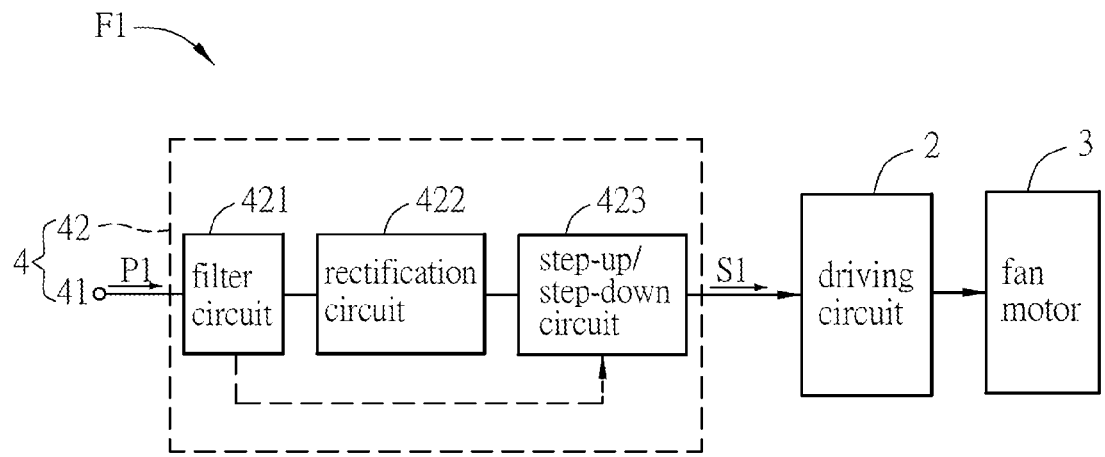
FIG. 5 is a schematic block diagram of a fan system of another embodiment of the invention.

FIG. 5 is a schematic block diagram of a fan system of another embodiment of the invention. As shown in FIG. 5, the fan system F1 of this embodiment includes a driving circuit 2, a fan motor 3 and a voltage stabilizing module 4. Since the illustrations about the driving circuit 2 and the fan motor 3 have been given in the above embodiment, they are omitted here for conciseness. In this embodiment, the voltage stabilizing module 4 includes an input end 41 and a voltage conversion unit 42 which is coupled with the input end 41. The main difference between the voltage stabilizing module 4 and the voltage stabilizing module 1 for multi power source input of the above embodiment is that the voltage stabilizing module 4 includes a single input end 41 instead of a plurality of input ends (a plurality of receiving ends 11), and therefore this embodiment is without the above-mentioned power source selection unit 12. The input end 41 can be coupled with an input power source P1 which can be a DC power source or an AC power source. The voltage conversion unit 42 receives the DC power source or the AC power source and keeps the DC power source or the AC power source at a working voltage level to act as a voltage signal S1 outputted to the driving circuit 2, so that the driving circuit 2 can drive the fan motor 3 to operate. That is, the fan system F1 of this embodiment can receive the DC power source or the AC power source through the same input end 41, which means the fan system F1 is compatible with the DC power source and the AC power source, so as to enhance the flexibility of the application of the fan system F1.

Furthermore, the voltage conversion unit 42 includes a filter circuit 421, a rectification circuit 422 and a step-up/step-down circuit 423. The filter circuit 421 is coupled with the input end 41. The rectification circuit 422 is coupled with the filter circuit 421. The step-up/step-down circuit 423 is coupled with the filter circuit 421 and the rectification circuit 422. The input end 41 of this embodiment makes the DC power source or the AC power source directly coupled with the filter circuit 421 for the operation of the noise filter and the subsequent voltage stabilizing process, so as to output the voltage signal S1. Herein, the illustrations of the filter circuit 421, the rectification circuit 422 and the step-up/step-down circuit 423 can be comprehended by referring to the illustrations of the filter circuit 131, the rectification circuit 132 and the step-up/step-down circuit 133 of the above embodiment, so they are omitted here for conciseness.

Summarily, in the fan system and the voltage stabilizing module for multi power source input of the invention, the power source selection unit is configured to receive the multiple input power sources and at least one of the input power sources is used as the working power source to be outputted to the driving circuit of the fan motor. Thereby, when the working power source fails, other input power sources can be introduced to be the new working power source so that the fan motor can still normally function. In some embodiments, the single input end of the fan system can allow the input of the DC power source or the AC power source. Besides, in some embodiments, the voltage conversion unit keeps the working power source at a working voltage level, and therefore the fan motor won't be affected by the voltage level of the input power source so as to be kept at the best efficiency. Furthermore, the driving circuit also won't be affected by the variation of the voltage of the input power source, and therefore the function of protecting the loading can be achieved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A voltage stabilizing module for multi power source input compatible with multiple input power sources including DC power source and/or AC power source, comprising:
    a plurality of receiving ends receiving the input power sources;
    a power source selection unit coupled with the receiving ends to receive the input power sources, including only one power output and setting at least one of the input power sources as a working power source to the power output; and
    a voltage conversion unit comprising:
        only one filter circuit coupled with the power output of the power source selection unit to receive the working power source among the input power sources;
        only one rectification circuit coupled with the filter circuit; and
        only one step-up/step-down circuit coupled with the filter circuit and the rectification circuit to keep the working power source at a working voltage level to act as a voltage signal outputted to a loading;
    wherein the power source selection unit is disposed between the plurality of receiving ends and the voltage conversion unit.

2. The voltage stabilizing module for multi power source input as recited in claim 1, wherein the power source selection unit includes:
    a switch circuit coupled with the receiving ends to receive the input power sources; and
    a control circuit coupled with the switch circuit.

3. The voltage stabilizing module for multi power source input as recited in claim 1, wherein the filter circuit filters out the noise of the working power source.

4. The voltage stabilizing module for multi power source input as recited in claim 1, wherein when the working power source is an AC power source, the rectification circuit rectifies the working power source into a DC power source.

5. The voltage stabilizing module for multi power source input as recited in claim 1, wherein the step-up/step-down circuit is a power factor correction (PFC) circuit.

6. A fan system compatible with multiple input power sources including DC power source and/or AC power source, comprising:
    a fan motor;
    a driving circuit connected with the fan motor; and
    a voltage stabilizing module for multi power source input, comprising:
        a plurality of receiving ends receiving the input power sources;
        a power source selection unit coupled with the receiving ends to receive the input power sources, including only one power output and setting at least one of the input power sources as a working power source to the power output; and
        a voltage conversion unit comprising:
            only one filter circuit coupled with the power output of the power source selection unit to receive the working power source among the input power sources;
            only one rectification circuit coupled with the filter circuit; and
            only one step-up/step-down circuit coupled with the filter circuit and the rectification circuit to keep the working power source at a working voltage level to act as a voltage signal outputted to the driving circuit;
        wherein the power source selection unit is disposed between the plurality of receiving ends and the voltage conversion unit,
        wherein the driving circuit receives the voltage signal to drive the fan motor to operate.

7. The fan system as recited in claim 6, wherein the power source selection unit includes:
    a switch circuit coupled with the receiving ends to receive the input power sources; and
    a control circuit coupled with the switch circuit.

8. The fan system as recited in claim 6, wherein the filter circuit filters out the noise of the working power source.

9. The fan system as recited in claim 6, wherein when the working power source is an AC power source, the rectification circuit rectifies the working power source into a DC power source.

10. The fan system as recited in claim 6, wherein the step-up/step-down circuit is a power factor correction (PFC) circuit.

* * * * *